July 9, 1935.  J. McCLAIN  2,007,687
INDICATOR FOR WATER GAUGES
Filed Nov. 4, 1933
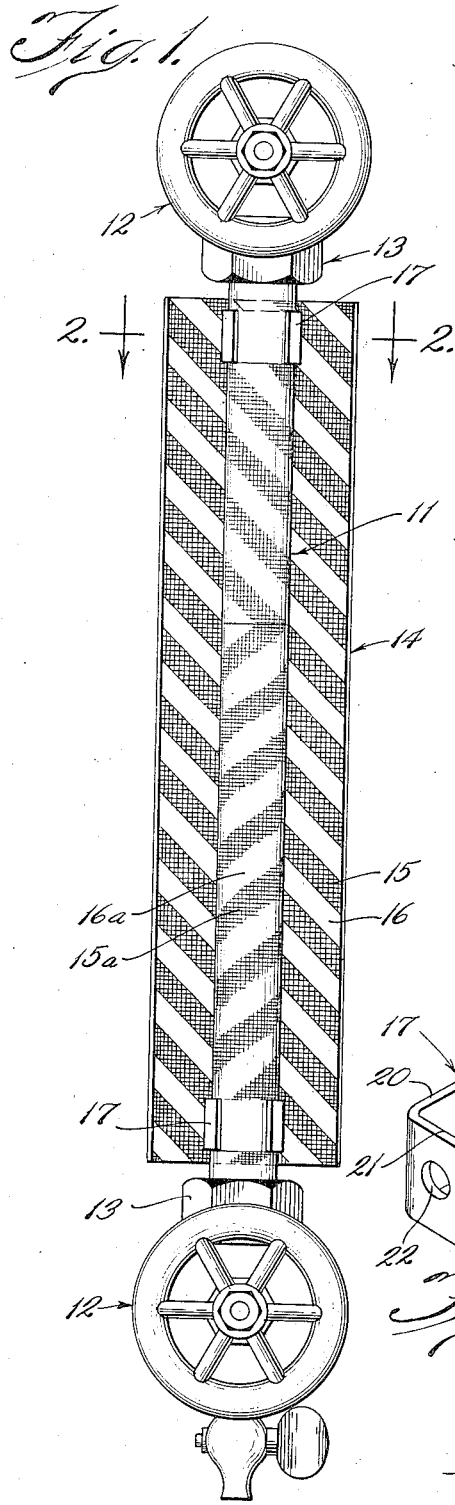
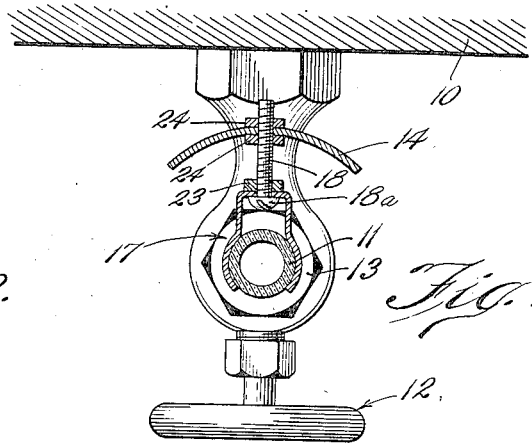
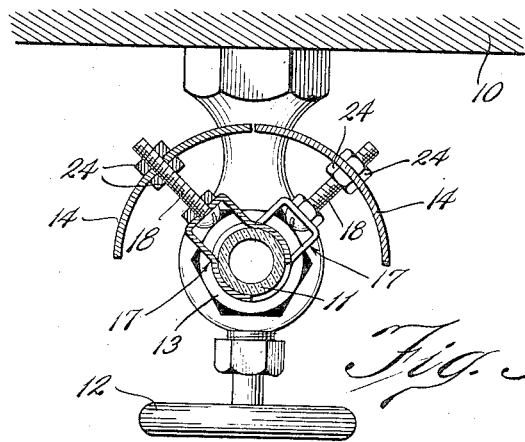
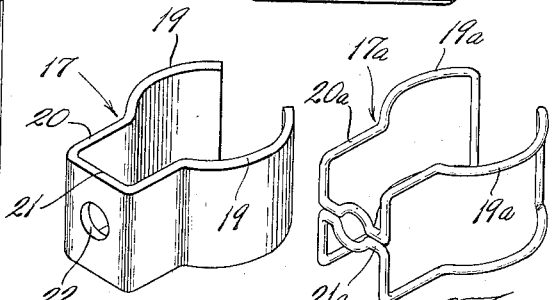
Inventor:
John McClain Patented July 9, 1935

2,007,687

UNITED STATES PATENT OFFICE 2,007,687

INDICATOR FOR WATER GAUGES

John McClain, Chicago, Ill.

Application November 4, 1933, Serial No. 696,677

4 Claims. (Cl. 73—54)

The invention relates generally to water gauges for boilers and the like, and more particularly it relates to an indicator adapted for association with such a gauge to facilitate reading of the gauge.

The primary object of the present invention is to provide a new and improved indicator of this character which may readily and easily be associated with a gauge to indicate clearly the height of the water in the gauge.

Other objects are to provide a new and improved device of this character adapted for mounting directly on the gauge glass in spaced relation thereto; and to provide such a device of simple and rugged construction adapted for accurate and finely graduated adjustment radially with respect to the gauge glass.

Other objects and advantages will become apparent from the following description, taken in connection with the accompanying drawing, in which:

Fig. 1 is a front elevational view of a device embodying the features of the invention.

Fig. 2 is a sectional view taken substantially along the line 2—2 of Fig. 1.

Fig. 3 is a sectional view similar to Fig. 2 and illustrating a modified form of the invention.

Fig. 4 is an enlarged perspective view showing the attachment clip utilized in the embodiments shown in Figs. 1 to 3.

Fig. 5 is a perspective view showing an alternative construction for the attachment clip.

For purposes of disclosure I have illustrated in the drawing and shall hereinafter describe in detail a preferred embodiment of the invention together with a modification, with the understanding that I do not intend to limit the invention to the particular construction and arrangement shown, it being contemplated that various changes may be made by those skilled in the art without departing from the spirit and scope of the appended claims.

For purposes of illustration I have shown in the drawing a water gauge mounted on a boiler wall 10 and having a vertical glass sight tube 11 supported between two valves 12 by means of packing glands 13 on the valves 12 which embrace the ends of the tube. Along one side of the sight tube 11, preferably the rear side, an indicator plate 14 is mounted to provide a contrasting background for emphasizing by contrast the height of the water in the tube. As shown herein, diagonal bands 15, 16 of contrasting colors are formed on the forward face of the indicator plate. These bands 15, 16, below the water level, are distorted as indicated at 15ᵃ, 16ᵃ when observed through the filled portion of the tube 11, so as to appear to extend at an angle to the other portions of the bands. Thus the level of the water in the tube may be readily observed.

The indicator plate 14 is preferably of arcuate cross section, as shown in Fig. 2, and is supported in spaced and substantially concentric relation to the tube 11 so as to facilitate observation of the water level from different directions. In case an exceptionally wide field of observation is desired, two such arcuate indicator plates 14 may be separately supported side by side adjacent the gauge glass as shown in Fig. 3. Each plate 14 preferably extends through substantially 90 degrees of arc so that the use of two such indicator plates as in Fig. 3 provides an indicator of substantially semi-cylindrical form.

To insure ease and simplicity in mounting the device on the gauge, and also to effect economy in manufacture, the present indicator is mounted directly on the gauge tube 11 and is arranged for finely graduated radial adjustment toward and away from the tube to bring the bands 15, 16 into proper focus. By reason of such mounting and radial adjustment, adaptation of the indicator to various sizes and types of gauges, and to various conditions of installation is facilitated.

In the exemplary form of the invention, a pair of resilient clips 17 are provided to embrace the tube 11 as shown in Figs. 1 and 2, and the indicator plate 14 is supported in adjustable spaced relation to the tube by means of screw devices 18 extending radially from the clips 17 and through the plate 14 adjacent opposite ends thereof. Preferably the clips 17 are formed from resilient sheet metal to provide a pair of opposed arcuately shaped arms 19 (Fig. 4) adapted to embrace opposite sides of the tube, the arms 19 being connected by an integral U-shaped portion 20 providing a cross bar 21 in spaced relation to the side of the tube 11. The screw device 18 projects outwardly through an aperture 22 in the cross bar 21 and is held in position by its head 18ᵃ and a clamp nut 23 engaging, respectively, the inner and outer faces of the cross bar 21.

For the purpose of adjusting the indicator plate 14 towards and away from the tube 11, clamp nuts 24 are threaded on the screw device 18 to engage the inner and outer surfaces of the plate.

Fig. 5 of the drawing illustrates an alternative form of clip 17ᵃ formed from resilient wire to provide arms 19ᵃ, a U-shaped connecting portion 20ᵃ and an apertured cross bar 21ᵃ. This clip may be associated with the tube 11 and the screw device 18 in the same manner as the form of clip shown in Figs. 1 to 4.

With the construction described, the indicator may be associated with various sizes and designs of gauges so as to give excellent results. Gauge tubes of various diameters, within certain limits, may be engaged by the attachment clips 17 by reason of the resiliency of the opposed arms 19 thereof, and the indicator plate will be supported in spaced relation to the gauge tube. Since the engagement of the clips 17 with the gauge tube is frictional in character, the indicator may be shifted about the tube to meet the varying conditions of the light or position involved in a particular installation. In case a variation of the lens effect of the water-filled tube is caused by differences in the thickness or diameter of the gauge tube, the effectiveness of the indicator may be restored by radial adjustment of the indicator plate along the supporting screw devices 18. Such adjustment may also be utilized to meet other varying conditions encountered in installation.

I claim as my invention:

1. An indicator device for gauges comprising, in combination, an elongated indicator plate of arcuate cross section having contrasting bands of color extending angularly across its inner face, a pair of resilient clips adapted to embrace and be supported by the glass tube of the gauge, and means carried by said clips for adjustably supporting said indicator in spaced substantially concentric relation to said gauge glass.

2. An indicator device for a boiler gauge having a glass sight tube comprising, in combination, an elongated indicator plate of arcuate cross section having contrasting stripes extending across the inner surfaces thereof, a pair of screw threaded members supported in radially extending relation to said tube, and nuts engaging said threaded members and supporting said indicator plate thereon in spaced relation to said tube, adjustable to move said plate toward and away from said tube.

3. A device of the character described, comprising a pair of resilient clips each having a pair of opposed arcuate arms adapted to embrace a tubular gauge tube and a U-shaped connecting portion joining corresponding ends of the arms to provide a cross bar spaced from the gauge tube upon which the clip is mounted, a pair of screw devices, one fixed to and extending from the cross bar of each clip in a radial direction with respect to the tube, an indicator plate having an inner surface with stripes thereon, said plate having apertures therein through which said screw devices project to support said plate, and a plurality of nuts on said screw devices operable to adjust the position of said plate radially of the tube.

4. An indicator for a tubular gauge glass comprising, in combination, an elongated indicator plate of arcuate cross section, and means for supporting said indicator plate in spaced substantially concentric relation to said gauge glass comprising resilient clips frictionally engageable with the exterior surface of the gauge glass in any rotative position about the axis of the gauge glass, and means integral with said clips connecting said device and said indicator plate adjustable to vary the distance therebetween.

JOHN McCLAIN.